United States Patent
Berto et al.

(10) Patent No.: US 9,254,059 B2
(45) Date of Patent: Feb. 9, 2016

(54) DEVICE FOR HEATING WATER AND PRODUCING STEAM

(75) Inventors: Giovanni Berto, Eindhoven (IT); Massimo Baldo, Eindhoven (IT); Marco Santini, Eindhoven (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 536 days.

(21) Appl. No.: 13/640,601

(22) PCT Filed: May 18, 2011

(86) PCT No.: PCT/IB2011/052179
§ 371 (c)(1),
(2), (4) Date: Oct. 11, 2012

(87) PCT Pub. No.: WO2011/145064
PCT Pub. Date: Nov. 24, 2011

(65) Prior Publication Data
US 2013/0055902 A1     Mar. 7, 2013

(30) Foreign Application Priority Data

May 21, 2010 (IT) ................. FI2010A0112

(51) Int. Cl.
*A47J 31/56* (2006.01)
*F24H 1/16* (2006.01)
*A47J 31/54* (2006.01)
*F24H 9/20* (2006.01)

(52) U.S. Cl.
CPC ............... *A47J 31/542* (2013.01); *F24H 1/162* (2013.01); *F24H 9/2028* (2013.01)

(58) Field of Classification Search
CPC ....... A47J 31/542; F24H 9/2028; F24H 1/162
USPC .................... 99/281, 294; 392/397, 481, 490; 219/494
See application file for complete search history.

(56) References Cited

U.S. PATENT DOCUMENTS

| | | | |
|---|---|---|---|
| 2,502,973 A * | 4/1950 | McDonald et al. .......... 122/13.3 |
| 4,320,702 A | 3/1982 | Shein | |
| 5,357,848 A | 10/1994 | Eugster | |
| 2008/0216665 A1 | 9/2008 | Hoehne et al. | |
| 2008/0271608 A1 | 11/2008 | Morin | |
| 2010/0112165 A1 | 5/2010 | Masciandaro et al. | |

FOREIGN PATENT DOCUMENTS

| | | |
|---|---|---|
| CN | 101258998 A | 9/2008 |
| CN | 101484052 A | 7/2009 |
| CN | 201341787 Y | 11/2009 |
| DE | 1074779 B | 2/1960 |
| DE | 8516331 U1 | 8/1985 |
| EP | 0353425 A2 | 2/1990 |

(Continued)

OTHER PUBLICATIONS

Machine translation of EP 0353425.*
Machine translation of DE 1074779.*

*Primary Examiner* — Jianying Atkisson

(57) ABSTRACT

A device includes a first water heater, having a first water duct and a first heating member, and a second water heater, having a second water duct. The first water heater and the second water heater are in thermal connection with each other.

18 Claims, 13 Drawing Sheets

(56) References Cited

FOREIGN PATENT DOCUMENTS

| FR | 1278224 | A | 12/1961 |
| JP | 2008501399 | A | 1/2008 |
| WO | 2010044116 | A2 | 4/2010 |
| WO | 2010044116 | A3 | 4/2010 |

* cited by examiner

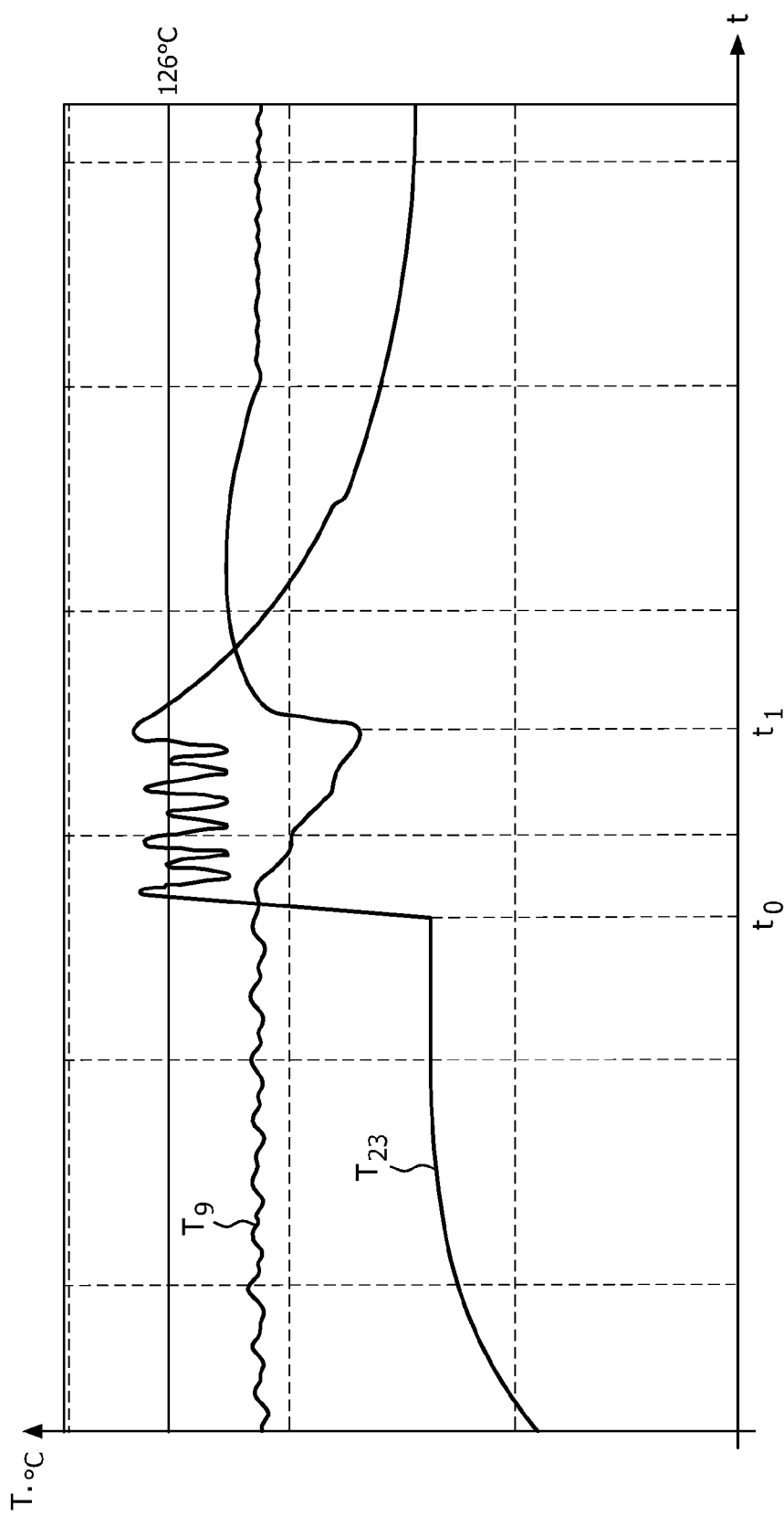

DEVICE FOR HEATING WATER AND PRODUCING STEAM

TECHNICAL FIELD

The present invention relates to the devices for producing hot water and steam. In particular, the invention relates the improvements to water heaters or devices for heating hot water and producing steam to be used on household appliances, in particular on machines for producing hot drinks, such as for example and in particular, but not exclusively, coffee machines.

BACKGROUND ART

In the electric coffee machines there is often provided the possibility of supplying hot water to a brewing unit for producing coffee and steam for producing hot milk, emulsified milk for producing cappuccino, milk with a dash of coffee, coffee-milk or analogous drinks. To this purpose a single water heater is usually used which, by controlling the heating resistance, can bring the water temperature to a first value (around 90-100° C.) suitable for preparing coffee and to a second value (around 120-140° C.) for producing steam. The steam is supplied through a nozzle to be input directly into a milk container in order to heat and/or emulsify it with air and form a milk foam. Alternatively, the steam is used to feed an emulsifying device wherein, by Venturi effect, the milk is sucked by an outer container, mixed to the steam and, in case, to a determined air flow to produce hot milk or emulsified milk.

In some known machines two distinct water heaters are used, the first one for producing hot water and the second one for producing steam. An example of machines of this kind is described in WO-A-2010/044116.

The two water heaters can be arranged in parallel. In other configurations (US-A-2008/0216665) the water heaters are arranged in series. In each case, the water heaters are constituted by separated members, housed in different areas inside the coffee machine.

US-A-2008/0271608 discloses a flow-through water heater for a coffee machine including a block of heat conductive material embedding a helically developing electrical resistor and two helically arranged water ducts. Water is fed through the first water duct when hot water is required to feed a brewing chamber. Water is alternatively fed through the second water duct if steam is required, instead. The single electrical resistor is controlled to achieve the desired temperature.

DE-85163331 U discloses a double flow-through water heater including a first water duct and a first electric resistor forming a first water heater as well as second water duct and a second electric resistor forming a second water heater. The ducts are connected either in parallel or in sequence. The purpose of the this known device is two obtain a higher water heating rate thanks to the double electric resistor heater arrangement.

Usually, in particular for abiding by the recent laws on energy saving, the used water heaters are without accumulation and usually comprise a duct with small volume, through which the water flows and wherein the water heats instantaneously while flowing by the effect of the heat received from an electric resistance placed in thermal connection with the water duct through a metallic mass wherein the resistance and the water duct are incorporated. In this case the water heater is constituted in substance by a heat exchanger, wherein the water is heated instantaneously, that is while it is requested by the users downstream of the water heater.

SUMMARY OF THE INVENTION

The present invention aims at improving the performances of the traditional water heaters. The object of some embodiments of the invention is to improve the thermal efficiency and therefore the energy saving obtainable in a device for producing hot water or steam.

According to a first aspect the invention relates to a device for heating water and producing steam comprising a first water heater, with a first water duct and a first heating member, and a second water heater with a second water duct and a second heating member, wherein the first water heater and the second water heater are in mutual thermal connection by means of a mass of heat-conductive material. The two heating members are controlled such as to produce alternatively hot water or steam. Heat by conduction can be exchanged from the first water heater to the second water heater or vice-versa. A series of advantages are thus achieved, which will be better explained in details hereinafter.

In some embodiments the two water heaters advantageously are connected so as to be able to work alternatively: in series, that is by making the water to flow through the first water heater and in sequence through the second water heater; or so as to make the first water heater, but not the second water heater, to operate by supplying hot water from the outlet of the first water heater towards a user. In the first case steam is produced, whereas in the second case hot water is produced. In some embodiments or using modes it can be provided that the two water heaters in series produce hot water instead of steam to a larger flow with respect to the one which can be obtained through the flow of the first water heater only.

In other embodiments the water heaters are connected in parallel and they can be fed by a single pump or by two pumps, one for each water heater. The pumps can suck water from a common tank. Even when the water heaters are arranged in parallel, they are advantageously positioned so as to exchange mutually heat by conduction. When the water heaters are arranged in parallel, the first water heater can be kept switched on at a temperature of 90-100° C. ready to supply hot water, for example for preparing coffee, whereas the other one is kept switched off, but heated by thermal conduction by the first water heater. When the steam supply is requested, the second water heater can be powered electrically, so as to bring it at the required temperature, and then the water is made to flow through the duct of the second water heater to produce steam. The first water heater can be switched off and is kept at a sufficiently high temperature by the effect of the heat transmitted by conduction by the second water heater during the steam supply phase.

By arranging the first and the second water heater so as to have a thermal exchange by conduction from one to the other one it is possible keeping the second water heater at a high temperature with respect to the environment temperature without the need of activating a specific heating member, but simply by using a portion of the heat produced by the first water heater. In this way, even when the second water heater is not used, and the first water heater only is powered electrically to be kept in temperature and in case to supply hot water, the second water heater remains at a temperature proximate the operative one, thanks to the thermal exchange by conduction between the two water heaters.

By thermally coupling the bodies of the two water heaters the whole surface of thermal exchange is reduced, with respect to the surface of a traditional system with two separate water heaters. This allows reducing the heat losses and improving insulation. Advantageously one single thermal insulation can enclose both water heaters. The heat dissipated by a water heater through the surface coupling to the other water heater is not lost, on the contrary it is used to keep in temperature the other water heater.

Currently, solutions are preferred wherein the first water heater provides a first electrical resistance and the second water heater provides a second electrical resistance. Even a configuration with more than two electrical resistances, for example three or four electrical resistances which can be controlled depending upon selected operating conditions, for example depending upon the (liquid or steam) state, the temperature threat one wishes to bring the outletting water or depending upon the flow, falls within the scope of the present invention. For example a single heating member for the first water heater and two heating members for the second water heater, which can be switched on singularly or together, can be provided.

Advantageously, the electrical resistances of the two water heaters are switched on, that is powered electrically, one alternatively to the other one. When one wishes to produce hot water, the electrical resistance forming the first heating member of the first water heater is activated, whereas the second electrical resistance, constituting the second heating member, remains switched off. Viceversa, when one wishes to produce steam or hot water at a higher temperatures, the second heating member is activated, that is the second electrical resistance is powered, whereas advantageously the first electrical resistance remains switched off.

This control mode allows limiting the maximum power absorbed by the machine wherein the device is used. In fact, in some embodiments, the electrical resistances at issue absorb a high power, in the order of 700-1700 W, preferably between 1000 and 1500 W, for example 1200-1400 W. In order not to increase excessively the maximum power absorbed by the machine, it is then convenient switching on only one or only the other one of the two electrical resistances. In some countries there are rules limiting the maximum power which can be absorbed by an electrical appliance. In this case the above-described alternated operation allows keeping the absorbed maximum power within adequate limits, whereas the mutual thermal contact between the water heaters allows bringing quickly the previously switched-off water heater at the operating temperature.

However, it is not excluded to control the device in a different way, when this is allowed by the power available onto the electrical system and/or when the two resistances have a sufficiently limited power. In such case, for example, one can assume to keep the first water heater always switched on and to switch on the second one (together with the first one) when steam is to be produced. In other embodiments the water heaters can be controlled so as to keep them both always powered electrically.

As the maximum power which can be absorbed by an electrical appliance can vary even depending upon the electrical appliance destination market, one can assume to modify the way of managing the resistances of the two water heaters by modifying the machine managing software leaving unaltered the electrical and hydraulic structure.

High powers for the two electrical resistances or heating members for the two water heaters are used for implementing the so-called instantaneous or flow-through water heaters. As mentioned previously, in reality these water heaters are implemented like heat exchangers wherein the water is fed along a duct of adequate length contained inside a block made of material with high thermal conductivity, for example metallic material, such as aluminium or the like. This metallic block is heated by the electrical resistance which is incorporated, too, inside the material with high thermal conductivity. The mass of material with high thermal conductivity is used then as member for transferring heat by conduction from the electrical resistance to the water flow duct. The water heater is kept at a prefixed temperature through a control unit and a temperature sensor, for example a NTC or PTC resistance. In other embodiments the temperature control can be obtained by means of simple thermostats, instead of with an electronic system. In some embodiments systems combining electronic sensors and thermostats can be provided.

The electrical resistance is powered in a controlled way so as to keep the water heater temperature within a time range around a predetermined value. When the water supply begins, the electrical resistance is usually kept switched on and the power thereof is so that it succeeds in heating instantaneously the water whereas this flows along the duct incorporated inside the material with high thermal conductivity, in turn heated by the electrical resistance.

The above is valid both for the first water heater and for the second water heater, which are both implemented like instantaneous or flow-through water heaters.

In an advantageous embodiment, the water duct of the first water heater and the water duct of the second water heater have a helical shape with one or more turns.

Preferably, the first water heater has a higher number of turns than the second water heater.

In some embodiments the number of turns of the first water heater is about twice the number of turns of the second water heater. Thus, a double water volume is obtained in the first water heater with respect to the water volume in the second water heater. These different water volumes for the two water heaters are preferred as the first water heater is intended for producing hot water with a flow which is relatively higher than the steam flow, for the production of which the second water heater is intended.

In a possible embodiment, the first water heater comprises a first block or body of thermally conductive material and the second water heater comprises a second block or body of thermally conductive material. Advantageously the first block of thermally conductive material and the second block of thermally conductive material have each one a face or surface of mutual thermal coupling. The two blocks or bodies of thermally conductive material are then mutually coupled the one to the other by placing the two thermal coupling faces the one in contact with the other, in case with the interposition of a material which increases the thermal conductivity by conduction, for example a material with pasty consistence. The interface formed by the coupling between the two thermal coupling faces of the first block and of the second block allows transferring heat by conduction from the first water heater to the second water heater.

Between the two blocks or bodies of thermally conductive material of the two water heaters, at the coupling interface between the two thermal coupling faces, one or more devices protecting from over-temperature, for example one or more thermo fuses, or so-called TCO (Thermal Cut Off, or Temperature Cut Off) can be arranged. These are constituted in substance by fuses suitably wired in the electric supply circuit of the first electrical resistance and/or of the second electrical resistance forming the first and the second heating member of the two water heaters. These thermo fuses guarantee the electric supply cut-off in case of over-temperature.

In some embodiments three thermofuses can be provided. For example, a thermofuse on the phase and a thermofuse on each one of two neutral conductors, one for each water heater, can be provided. However, other arrangements are not excluded, with only two thermo fuses one on the phase and one on the neutral, upstream of respective branches towards the two water heaters. In general, the number and the arrangement of the thermofuses or other safety devices against the over-temperature, are so as to allow opening the supply circuit of both water heaters in case the temperature of the two water heaters overcomes a threshold value. By arranging the thermofuses or other equivalent components in a central area between the two water heaters, they can protect, in case of failures, both the first and the second water heater. The arrangement of the device according to the invention allows obtaining advantages even in terms of reduction of the number of the electrical components with respect, for example, to arrangements wherein two separate water heaters are provided. In fact, in the latter case the known devices request at least four thermofuses.

The two blocks or bodies of thermally conductive material can be manufactured by pressure die casting incorporating inside thereof a respective electrical resistance and a respective water duct and then coupled by means of a reversible coupling, for example a screw coupling, for example for allowing to dismantle and to replace only one water heater in case of failure.

In a different embodiment a single block of thermally conductive material, for example aluminium or an aluminium-based alloy, can be provided, which can be manufactured by pressure die casting incorporating inside thereof the first resistance, the second resistance, the first water duct, the second water duct. In this way the heat transfer by conduction takes place inside a single block of thermally conductive material. In order to avoid that the first water heater overheats when the second water heater is switched on, that is when the second electrical resistance forming the second heating member is switched on, whereas the first electrical resistance forming the first heating member is switched off, in some embodiments empty volumes can be provided inside the thermally conductive material forming the block enclosing the electrical resistances and the water ducts. The cross section of these empty areas and the cross section of the areas of full material are calculated so as to guarantee a sufficient heat flow by conduction from the one to the other one of the two water heaters by avoiding, at the same time, that for example the water in the first water heater heats excessively in the phase wherein the second water heater is switched on.

In some embodiments a first temperature sensor associated to the first water heater and a second temperature sensor associated to the second water heater can be provided, both connected to an electronic control unit, which by means of said sensors receives information about the temperature of the two water heaters and controls the electric resistances. However, the possibility of using a single temperature sensor associated to the first water heater or to the second water heater and of evaluating the temperature of the water heater thereto a temperature sensor is not coupled by means of a calculation algorithm depending upon the geometrical and physical features of the two water heaters is not excluded. For example, a temperature sensor can be provided on the outlet of the first water heater providing a temperature value to the electronic control unit, which is programmed to perform a calculation in order to evaluate the temperature at the outlet of the second water heater. This is possible for example by taking into account the physical parameters of the used material (thermal capacity and thermal conductivity) and the system geometry. The calculation algorithm will also take into account the switching-on and switching-off condition of the two electrical resistances. In other embodiments two thermostats of electromechanical type can be provided, one for each water heater. Or systems combined with a temperature sensor and a thermostat can be used, for example an electronic sensor on the water heater for producing hot water, which requires a more precise temperature check, and a thermostat on the water heater for producing steam. The use of thermostats in replacement of thermal sensors can allows implementing machines without electronic devices or with very simplified, and therefore very inexpensive, electronic devices.

In some embodiments a hydraulic circuit connecting between the first water heater and the second water heater can be provided, implemented in the following way: the first water heater comprises a water inlet and a water outlet, the first water duct extending between said inlet and said outlet. The outlet of the water duct of the first water heater is connected to the inlet of the second water duct, which is in the second water heater. Members are arranged between the outlet of the first water heater and the inlet of the second water heater, allowing alternatively: to supply water from the first water heater towards a user, for example a brewing unit for producing coffee; or to connect in series the water duct of the first water heater with the water duct of the second water heater, by feeding then the water sequentially through the first water duct and through the second water duct.

With an arrangement of this type it is possible providing a control unit programmed so as: to keep the first water heater at a first temperature through a first heating member, to supply water at said first temperature through a supplying line in flow connection between the outlet of the first water heater and the inlet of the second water heater; and to raise the water temperature at a second temperature, higher than the first temperature, or so as to produce steam by arranging in series the first water duct and the second water duct. The switching from one to the other one of both operating conditions can take place by acting for example onto a specific three-way valve or other suitable switching device.

The above-described operation can be obtained by using a single heating member and by increasing the length of the route performed by the water inside the device, crossing the first and the second water heater once the first water duct and the second water duct have been placed in series. However, preferably, two heating members are provided and the steam or water at higher temperature (or at higher flow) are produced by activating the second heating member and by deactivating the first heating member, whereas when one wishes to extract hot water outletting from the first water heater, only the first heating member is activated, keeping the second heating member switched off.

In substance, it is possible programming the device control unit so as:

to keep the first water heater at a first temperature by means of the first heating member keeping the second heating member switched off; in such case the water at the first temperature is supplied by means of a supply line without flowing through the duct of the second water heater;

or, alternatively, so as to raise the water temperature at a second temperature, higher than the first temperature, through the second heating member, by switching a valve for connecting between the first water duct and the second water duct so as to make the water to flow in sequence through the first water duct and through the second water duct, keeping the first heating member switched off, whereas the second heating member is switched on, or even keeping both heating members switched on.

A heating device of the above-described type can be used advantageously for example in a coffee machine wherein it is necessary to supply hot water to a brewing unit for producing coffee and alternatively steam to a milk emulsifying device to produce hot milk or emulsified milk.

The arrangement of the two water heaters in thermal connection one with the other so as to be able to transmit heat by conduction from the first water heater to the second water heater or vice versa first of all allows an advantage in terms of energy saving. The first water heater is kept switched on and in temperature, whereas the second water heater is kept switched off. When the two water heaters have each one a respective heating member, that is a respective electrical resistance, this means keeping the first resistance switched on and the second one switched off. In the traditional solutions of this type, as the water heaters are distant from one another, the water heater for producing steam, that is the second water heater, remains substantially at room temperature. When the user requires steam to be supplied it is then necessary waiting a necessary relatively long time so that the second electrical resistance heats the second water heater until reaching the temperature sufficient to produce steam.

Vice versa, by arranging the first water heater and the second water heater in thermal connection one with respect to the other, the second water heater is heated in passive way by the first water heater. When the user wishes to supply coffee, the device supplies hot water from the first water heater, whereas the second water heater remains at a substantially higher temperature than the room temperature by the effect of the simple passive heating.

On the contrary, when the user wishes to supply steam, the control system switches the heating device by switching off, in case, the first water heater and by switching on the second water heater, which in turn is already at a temperature quite near to the steam producing temperature. The heating times are then extremely reduced and analogously the absorbed energy is reduced.

If the first water heater is switched off during the supply of steam heated by the second water heater, the thermal connection between the two water heaters, however, allows keeping in temperature the first water heater, so that if the user wishes to supply hot water soon after having stopped the steam supply, the hot water can be supplied immediately without the need of waiting for a new heating of the first water heater which has remained switched off for the whole period of the steam supply.

Apart from an energy saving, in this way, a substantially higher response speed of the device in the passage from one supply mode to the other one is obtained. This is valid in particular in the passage from the hot water production (or from a waiting condition in temperature, in which condition the first water heater is switched on and the second one is switched off) to the steam production. However, advantages in terms of speed are obtained also in the opposite passage.

It has been found that the performances of the device for producing hot water and steam being equal, the size of the first water heater and of the second water heater according to the invention are substantially equivalent to the size of a single water heater intended to the alternative production of hot water and steam according to a traditional scheme, that is with a single duct for the water and a single resistance the power and temperature of which are raised when steam supply is requested. It is then possible replacing a traditional water heater with a device according to the present invention comprising the double water heater with the above-mentioned advantages. In some embodiments, the use of the double water heater according to the invention allows quicker response time and less energy consumption than in the case of a single water heater operating in two different temperature conditions. It has to be noted, in this respect, that in a traditional single water heater, at the end of the steam supply it is necessary to bring back the water heater at a temperature lower than the steam producing temperature, for example from 125-140° C. to 90-100° C. This is obtained by discharging water from the water heater, with consequent waste of thermal energy. Apart from this drawback, the cleaning out of hot water involves other drawbacks, such as the discharge water accumulation in the collection trays of the machine wherein the water heater is inserted, with need for the user of more frequent emptying operations. This water discharge is not necessary in case of double or composite water heater according to the invention. With respect to solutions using a single water heater, then, advantages in terms of less quantity of discharged water in the passage from the steam supply to the water supply are obtained with consequent advantages in terms of global reduction of electric consumption and of higher user friendliness.

Furthermore, the configuration of the device according to the invention allows advantages in terms of reduction of the electric components, as for example the number of used thermofuses (TCO) can be reduced.

An additional advantage obtainable in some embodiments of the invention is to reduce the thermal dispersions with respect to configurations using two distinct and separate water heaters. The thermal dispersion surface towards the environment, in fact, is less and even the cost of the insulation material of the two coupled water heaters can be reduced.

According to a further aspect the invention relates to a machine for producing drinks, with first users which have to be fed with hot water and second users which have to be fed with steam or with hot water at a higher temperature than the one fed to the first users. In particular, the machine can be a coffee machine of the type comprising a brewing unit and a device fed with steam, for example a so-called steam-supplying spout, or a milk-emulsifying device, or other device fed with steam. Characteristically, a device for heating water and for producing steam as above described is inserted in the machine.

Additional and advantageous features and embodiments of the invention, as well as additional advantages will be described more in detail hereinafter with reference to some embodiments.

BRIEF DESCRIPTION OF THE DRAWINGS

The present invention will be better understood by following the description and the enclosed drawing, which shows practical, not limiting embodiments of the invention. More in particular, in the drawing:

FIGS. 8A-8E show diagrams with temperature curves depending upon time under various operating conditions.

DETAILED DESCRIPTION OF EMBODIMENTS OF THE INVENTION

FIGS. 1 to 9 show embodiments wherein the water heaters can be connected in series when steam has to be supplied.

Figure 1:
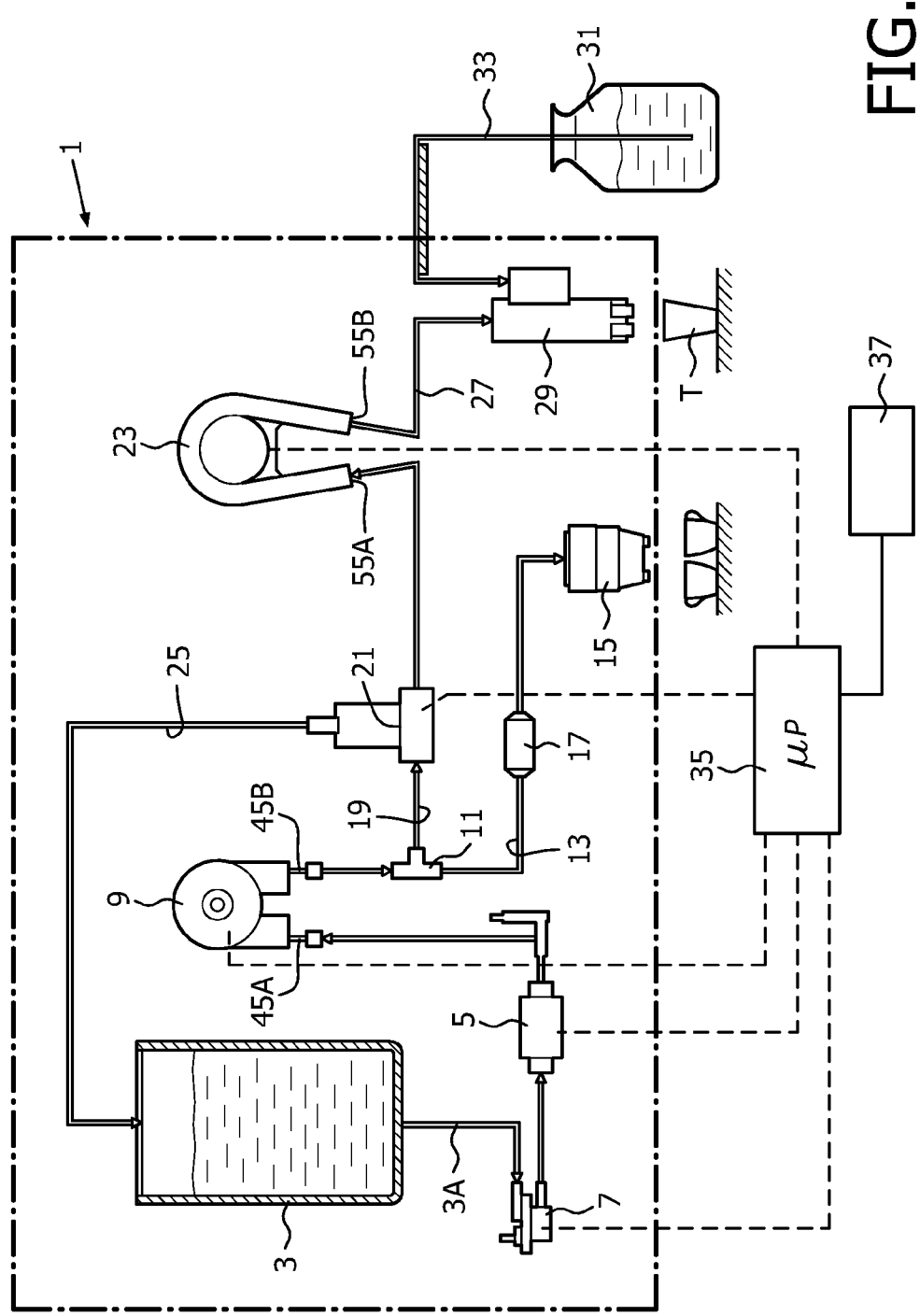
FIG. 1 shows an explaining block diagram.

FIG. 1 shows a functional scheme of the main members of a coffee machine wherein a device for producing water and steam according to the invention is inserted. Reference number designates as a whole the group of the members of the coffee machine, limited to those portions which are of interest in the present description. In particular, in the scheme of FIG. 1 a water tank 3 is shown, with a supply duct 3A, through which water is sucked by means of a pump 5. Reference number 7 designates a flow meter for determining the quantity of water sucked by the pump 5. The discharge of the pump 5 is connected to a first flow-through water heater 9 for producing hot water. A T-joint 11 on the outlet of the water heater 9 allows supplying the hot water through a line 13 to a brewing unit 15 for producing coffee. The brewing unit 15 can receive single-dose capsules or pods or coffee powder coming from a tank or a coffee grinder fed with coffee beans dispensed from a not shown container. A pressure controlling valve 17 is arranged on the line 13.

The T-joint, schematically designated with 11, has a second outlet 19 connecting to a three-way electrovalve 21. The electrovalve 21 can switch so as to feed water outletting from the first water heater 9 to a second through-flow water heater 23 for producing steam. Alternatively, the electrovalve 21 can open a discharge line 25 to discharge the water into the tank 3 or into a not shown collection basin. The electrovalve 21 can be replaced by a valve of other type, or by any switching device, for example a tap or selector, in case even with manual operation.

The second water heater 23 has a supply line 27 for feeding steam produced by the second water heater 23 to a steam dispensing spout, to an emulsifying device 29 or to any other member requesting steam feed. It can be provided that the steam-supply line 27 is in connection with a plurality of different supplying members which can be selected for example by means of a not shown group of electrovalves. In the scheme of FIG. 1 only the emulsifying device 29 is shown, through which the pressurized steam flow, fed by the line 27, is used to suck and heat milk from a container 31 through a sucking duct 33 and to supply hot emulsified milk in a cup T, which is placed under the emulsifying device 29.

In the diagram of FIG. 1 a programmable control unit 35 is also schematically illustrated, comprising a microcontroller or a microprocessor and connected to a user interface 37, constituted for example by a panel with display and control switches, e.g. of capacitive type. The control unit 35 is in connection with the flow meter 7, the pump 5, the water heater 9, the water heater 23, the electrovalve 21 and other components of the coffee machine 1, not shown and known on themselves. As it will appear clearer hereinafter, the control unit 35 is interfaced to the water heaters 9 and 23 through temperature sensors and it allows managing the water heaters and the other members of the machine 1 depending upon the controls given by the user through the interface 37.

The scheme of FIG. 1 as a whole is substantially known. The improvements introduced by the present invention relate in particular to the configuration of the water heaters 9 and 23 and the modes, according to which they are controlled by the programmable control unit 35. These improvements will be described hereinafter by referring to specific exemplary embodiments.

According to the invention, the water heaters 9 and 23 are joined to form a portion of a device for producing hot water and steam, designated as a whole with 2. By initially referring to FIGS. 2 to 7, in one embodiment the water heaters 9 and 23 are constituted by separate components which are coupled therebetween when assembling the device, so as to obtain a thermal exchange by conduction between metallic masses enclosing the main members of the two water heaters.

In some embodiments the water heater 9 comprises a body 41 formed with a material with high thermal conductivity, for example aluminium or an alloy thereof. The body 41 can be obtained by pressure die casting. Inside the block of thermally conductive material of the body 41 a first electrical resistance 43 is housed forming a first heating member. The electrical connectors of the electrical resistance 43 for the connection with the power supply are designated with 43A and 43B. The electrical resistance 43 can be approximately U-shaped, as shown in particular in FIG. 4. In other embodiments the electrical resistance 43 can have a plurality of turns inside the block of thermally conductive material forming the body 41.

Inside the block of thermally conductive material forming the body 41 a first water duct, designated with 45, is further arranged. The first duct 45 comprises an inlet 45A and an outlet 45B. Between the inlet 45A and the outlet 45B the first duct 45 extends for a sufficient length to contain a water quantity which can be heated in a quick way during the supply. In the illustrated example the duct 45 has a helical shape and it forms, inside the body 41, four helical turns. In some embodiments the whole volume of water contained in the first duct 45 can be comprised between 5 and 20 grams, preferably between 8 and 15 grams, for example about 10 grams. However, the values mentioned above have to be meant exclusively as an example and not limiting.

A temperature sensor 47 with an electrical connector 49 to provide a temperature signal to the programmable control unit 35 is associated to the body 41. The duct 45 could also have a different shape, for example coil-like shape. In the illustrated example it is formed by a tube made of thermally conductive material and suitable to the contact with food products, for example made of stainless steel. The outer surface of the duct 45 is in direct contact with the block of thermally conductive material forming the body 41, so that the heat generated by Joule effect by the electrical resistance 43 is transmitted by conduction to the inner wall of the duct 45 and from there by forced convection to the water flowing into the duct 45.

The water heater 23 comprises a body 51 formed by a block of thermally conductive material, for example aluminium or an alloy thereof, advantageously manufactured by pressure die casting. A second electrical resistance 53, whose electrical connectors for the connection to the power supply are indicated with 53A and 53B, is housed inside the block of thermally conductive material forming the body 51. In some embodiments the second electrical resistance 53, forming a second heating member, can be approximately U-shaped as represented in figure. As for the first electrical resistance 43, also the second electrical resistance 53 could have a different shape, for example a helical shape.

A second water duct 55 is incorporated inside the block of thermally conductive material forming the body 51. The second water duct 55 has an inlet 55A and an outlet 55B. In some embodiments the second water duct 55 has a helical shape with an adequate number of forming turns, with a water volume sufficient for producing steam during the supply. In some embodiments the inner volume of the duct 55 is about half the inner volume of the duct 45 and therefore in the illustrated example the duct 55 forms two helical turns. The second duct 55 can be made of stainless steel, like the duct 45, and it is in thermal contact with the body 51 so that the heat generated by the electrical resistance 53 is transferred by thermal conduction to the inner wall of the duct 55 and from there by forced convection to the water flowing into the duct 55. Inside the duct 55 the water phase transition from liquid to steam takes place.

A second temperature sensor 57 connected through a conductor 59 to the programmable control unit 35 is associated to the body 51 of the water heater 23.

The two bodies 41 and 51 formed by the two blocks of thermally conductive material are coupled to one another, for example with a reversible coupling obtained with a central screw 61. In other embodiments a stable and irreversible coupling can be provided, for example by gluing with a thermally conductive glue, although a reversible coupling can be more advantageous since it allows the replacement of components of one or of the other of the two water heaters or even of the whole water heater 9 or 23 in case of failure, without the need of replacing the whole group of the two water heaters 9 and 23.

Figure 3:
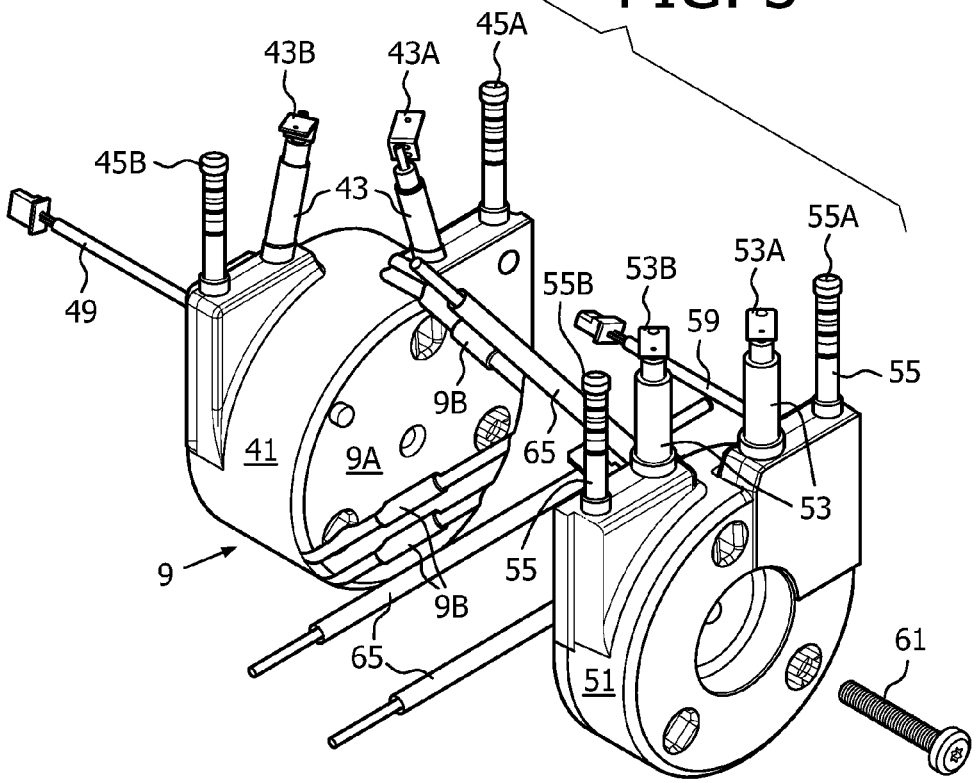
FIG. 3 shows an axonometric view of the two separate water heaters.
Figure 3A:
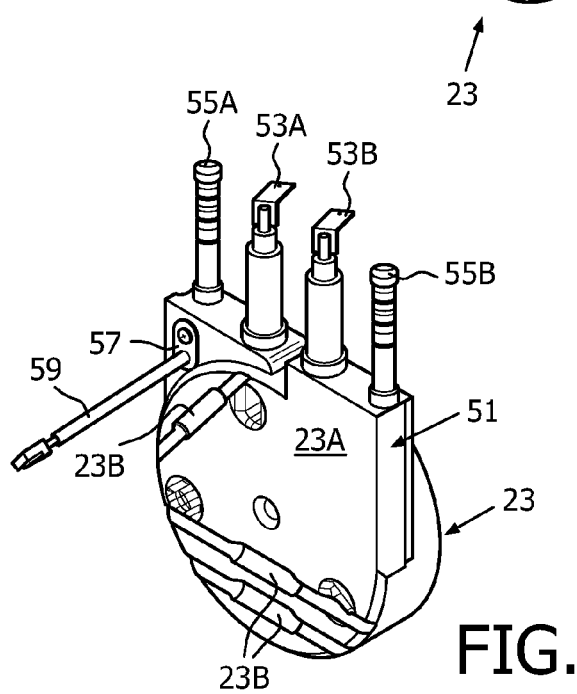
FIG. 3A shows an axonometric view of the second water heater, from the side of the face thermally coupling to the first water heater.
Figure 4:
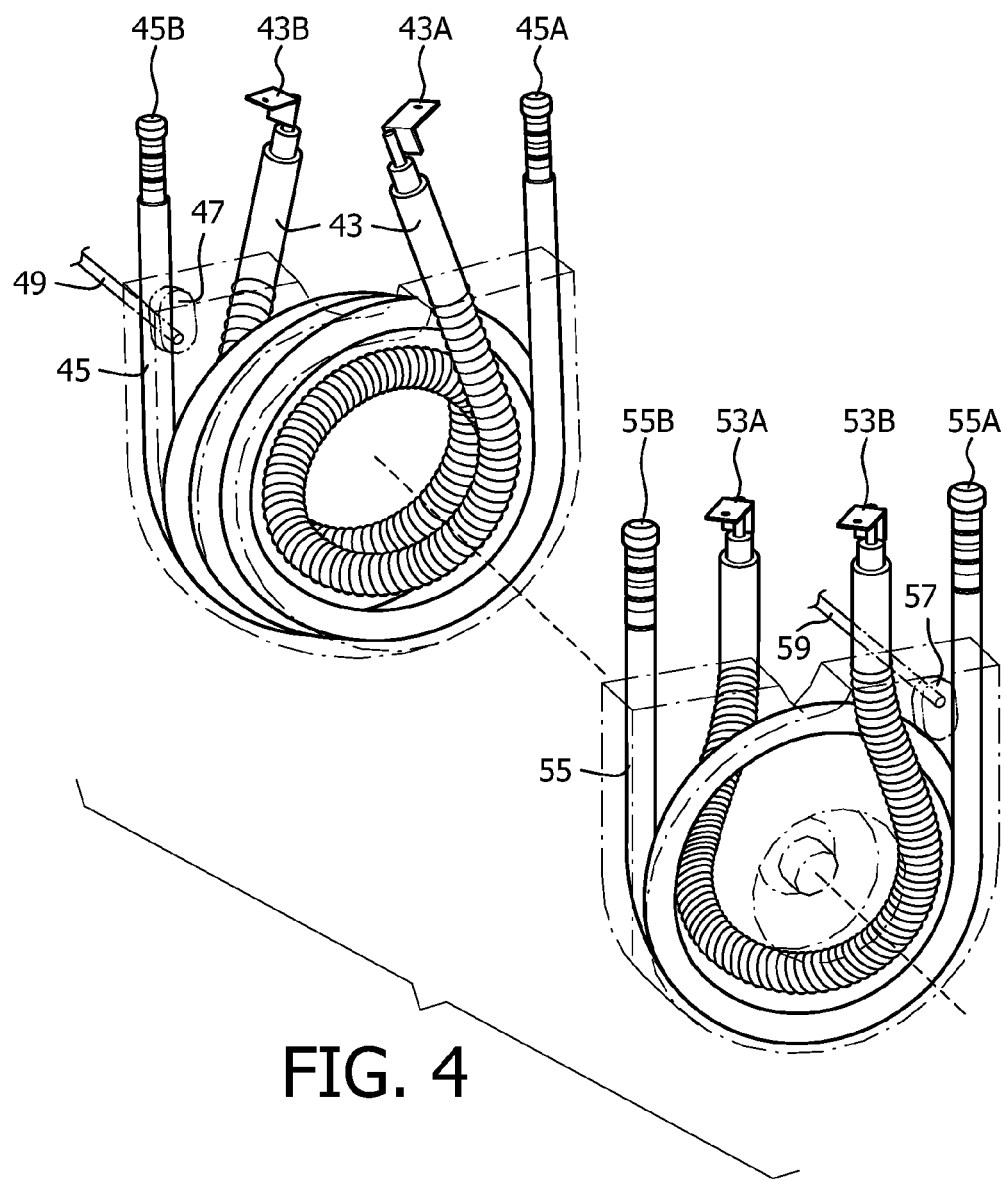
FIG. 4 shows a schematic representation of the heating electrical resistances and of the flow ducts for the water of the two water heaters.
Figure 5:
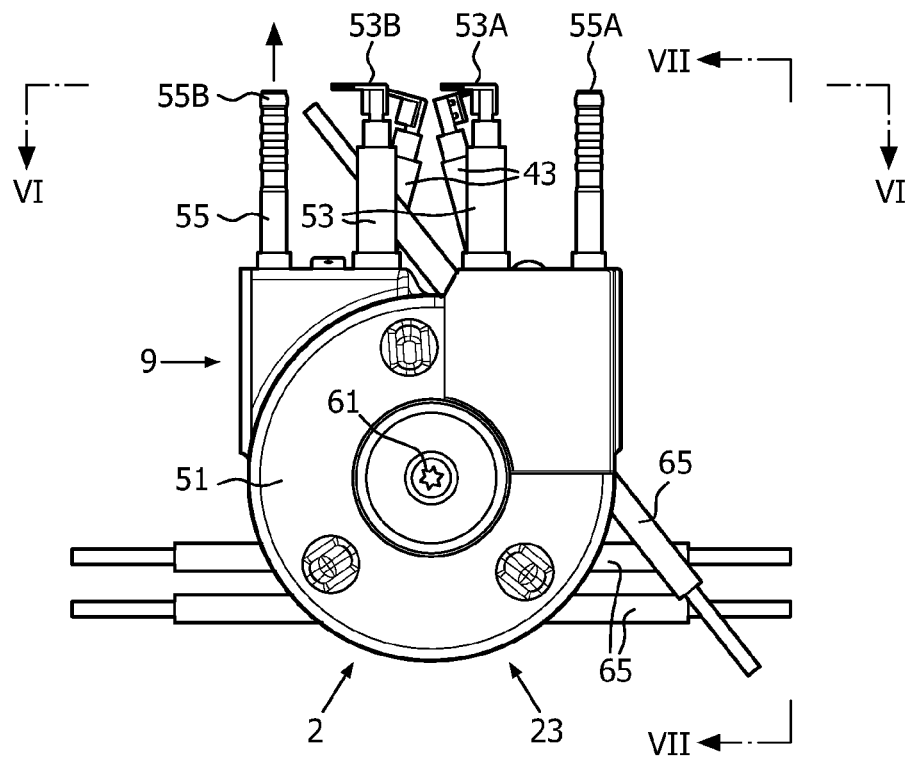
FIG. 5 shows a front view of the two water heaters.

FIG. 3 shows the two water heaters 9 and 23 separated before the mechanical and thermal coupling thereof. In FIG. 3 the surface or face 9A for the thermal or mechanical coupling of the water heater 9 to the water heater 23 can be seen. FIG. 3A shows the face or surface 23A of thermal or mechanical coupling of the water heater 23 to the water heater 9, not visible in FIG. 3.

The coupling faces 9A and 23A are advantageously planar and manufactured with sufficient precision to allow a mechanical coupling with a low resistance to the heat transmission. The heat transmission between the two bodies 41 and 51 of the two water heaters 9 and 23 can be improved by placing at the interface a thermally conductive paste enlarging the thermal exchange surface.

As shown in FIGS. 3 and 3A on the two faces 9A and 23A grooves 9B and 23B are formed which, when the two bodies 41 and 51 are coupled to one another, form seats for thermofuses 65. The thermofuses 65 (TCO) are safety devices which in case of over-temperature cut off the power supply to the device 2 formed by the assembly of the two water heaters 9 and 23 with the related accessory components. In order to fulfil the requests imposed by the current rules on safety, the thermofuses 65 are in redundant number. The possibility of changing the total number of the thermofuses 65 is not excluded.

Figure 2:
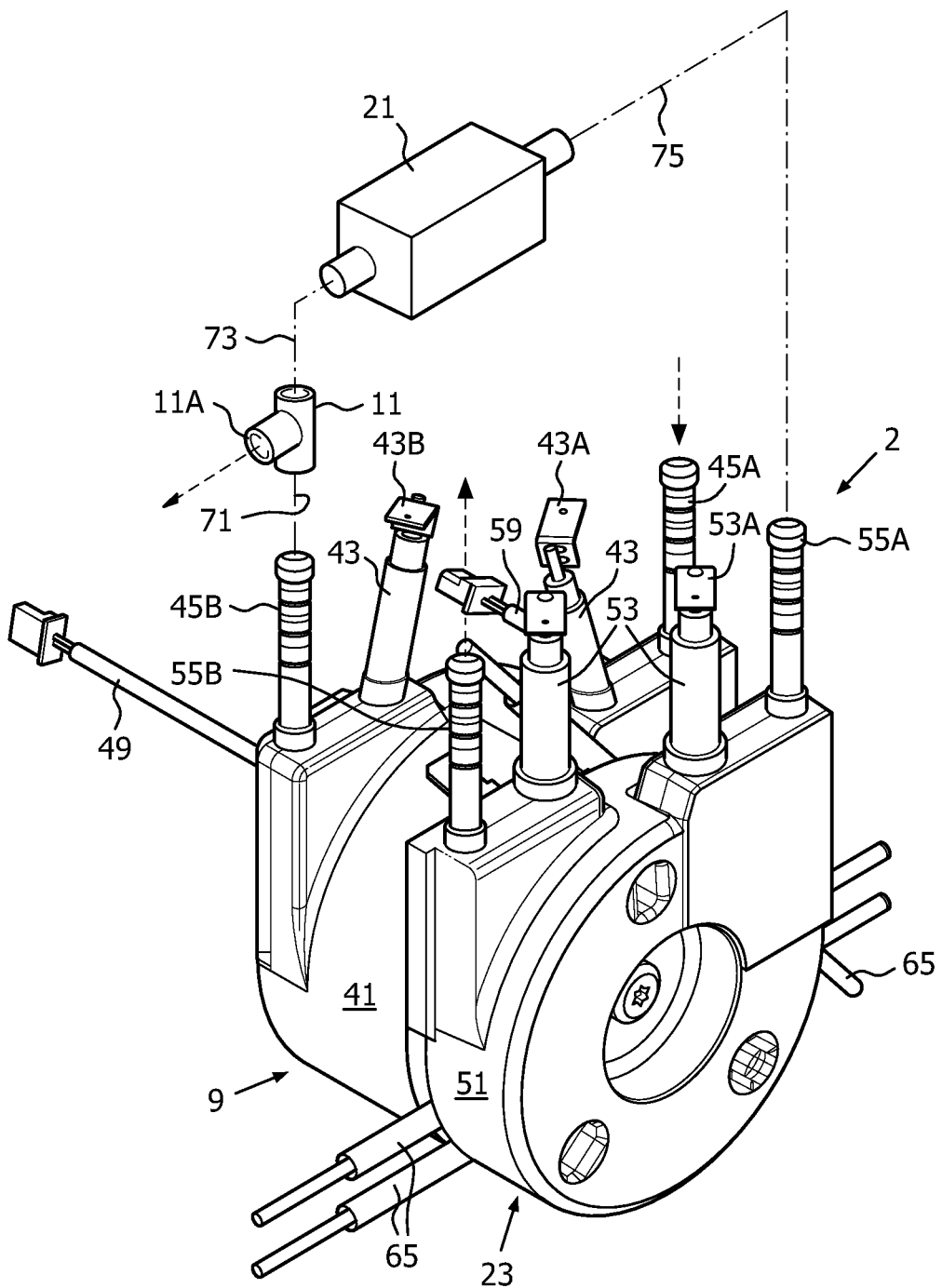
FIG. 2 shows an axonometric view of a water heater according to the invention in a first embodiment.
Figure 6:
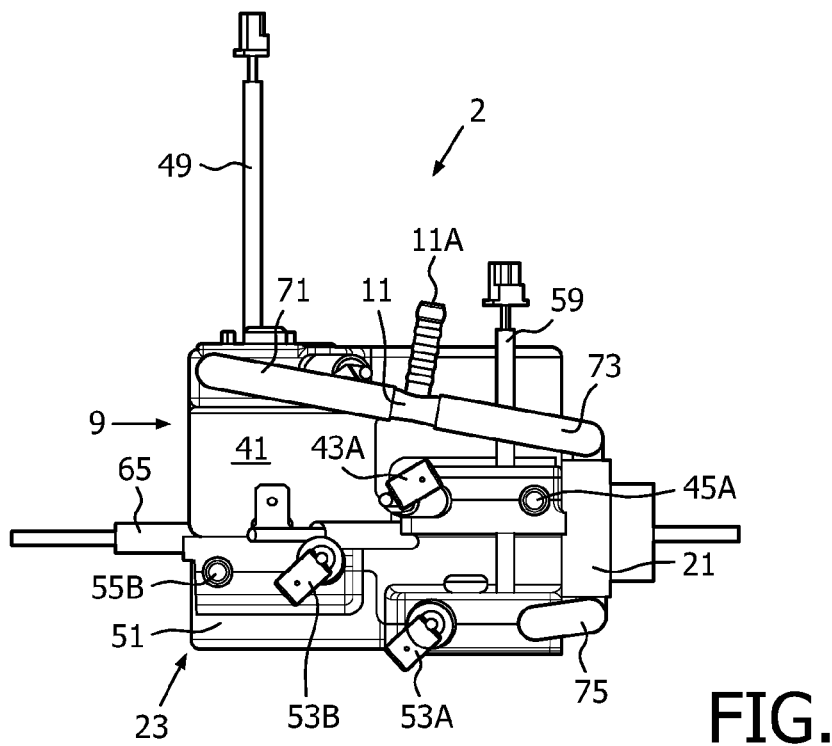
FIG. 6 shows a view according to VI-VI of FIG. 5.

As schematically represented in FIGS. 1 and 2, and constructively in FIG. 6, the first water duct 45 and the second water duct 55 are connected therebetween with flexible tubes outside the body 41 and the body 51 of the two water heaters 9 and 23. These tubes are omitted for the sake of drawing clarity in the other figures. More in particular, a first flexible tube 71 and a second flexible tube 73, between which the T-joint 11 is interposed, connect the outlet 45B of the first water duct 45 to the three-way electrovalve 21. The outlet 11A of the T-joint 11 is connected, as shown in the scheme of FIG. 1, to the line 13 feeding the hot water to the brewing unit 15. The three-way electrovalve 21, in turn, is connected through a flexible tube 75 to the inlet 55A of the second water duct 55.

From what described so far it is understood that with a coupling between the bodies 41 and 51 of the water heaters 9 and 23 a heat transmission from one to the other of the two water heaters is obtained, with a plurality of advantages which will be described more in details hereinafter.

The electrical resistances 43 and 53 forming the heating members of the two water heaters 9 and 23 can have absorption powers in the order of 1000-1400 W. These powers together with the small water volume contained in the ducts 45 and 55 allow heating the water and/or producing the steam instantaneously, that is while the water is fed by the pump 5, without the need for accumulation.

Moreover, the high power absorbed by the two resistances 43 and 53 imposes not to keep the two resistances switched on simultaneously, to reduce the total power absorbed by the device 2. Therefore, the device can operate in the following way.

When the coffee machine 1 is switched on and ready for use, the programmable control unit 35 keeps the water heater 9 in temperature, by switching on, if needed, the resistance 43 depending upon the temperature signal coming from the temperature sensor 47. Thanks to the thermal inertia of the body 41 and of the duct 45 with the water mass contained therein, the electrical resistance 43 can be switched on in a discontinuous way, in order to keep the temperature of the water heater within a range about a predetermined value, for example comprised between 90-100° C. In this phase the resistance 53 of the second water heater 23 is kept switched off.

However, thanks to the thermal coupling between the bodies 41 and 51 formed by the blocks of thermally conductive material of the two water heaters 9 and 23, the second water heater 23 is kept however at a substantially higher temperature than the room temperature. For example from performed tests it resulted that the temperature of the second water heater 23 is in the order of 70° C. or 80° C., when the first water heater 9 is kept in temperature around 95° C. through the resistance 45 and the second resistance 55 is switched off. The temperatures are usually measured in a selected point or location inside the body of conductive material 41 or 51. The actual temperature of the water is substantially correlated to the temperature measured on the body of thermally conductive material of the respective water heater.

When, through the interface 37, the user requests the supply of a coffee, the pump 5 feeds water from the tank 3 to the first water heater 9 at an adequate pressure depending upon the brewing pressure, for example in the order of 12-18 bar. The electrovalve 21 is kept close so that the hot water generated by the water heater 9 flows through the joint 11 towards the brewing unit 15.

When the user requests the steam generation, for example for producing hot milk or emulsified milk, the control unit 35 causes the switching-off of the resistance 45 of the first water heater 9 and the switching-on of the resistance 55 of the second water heater 23. In extremely short time, thanks to the fact that the water heater 23 is at a high temperature by the effect of the heat transmitted by conduction between the body 41 and the body 51, the water heater 23 is brought at the steam generation temperature, for example 120-140° C. This temperature is detected through the temperature sensor 57. Once reached the requested temperature, the pump 5 can start feeding water with low flow to produce steam instantaneously in sufficient quantity within the water heater 23 and feed it along the line 27 (FIG. 1) towards the emulsifying device 29 or other member of the machine.

During the steam supply phase, although the electrical resistance 45 is switched off, the water heater 9 does not cool down excessively thanks to the thermal exchange between the two bodies 41 and 51. In this way, if after the steam supply there is the immediate request of a supply of a new coffee, the machine is able to feed water to the brewing unit 15 substantially without the user having to wait. When the steam supply is interrupted, the second resistance 55 is switched off and the first resistance 45 is switched on again until bringing the water heater 9 at the set temperature value. As said, the time for reaching this temperature is extremely short and it could be wholly masked for example by the time required for grinding the coffee beans if the machine is a machine fed with coffee beans instead of with capsules, or by the time for inserting a coffee capsule and for closing the brewing unit.

Figure 7:
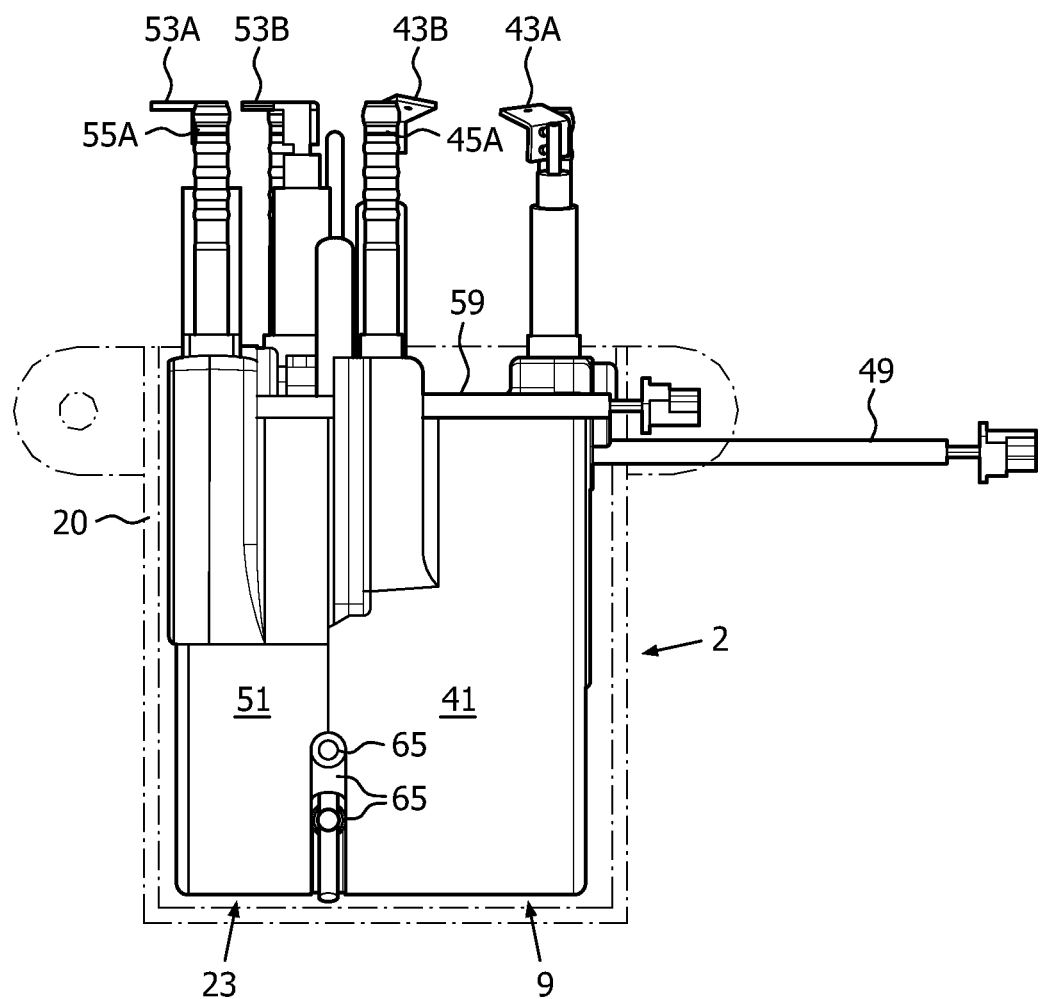
FIG. 7 shows a view according to VII-VII of FIG. 5.

In FIG. 7 a housing 20, for example made of plastic, in which the assembly formed by the water heaters 9 and 23 is housed, is shown in dotted lines. The housing 20 can be made of thermally insulating material. As the whole volume of the two water heaters is substantially equivalent to the volume of two separate water heaters usually used for the same function, the dissipating surface is reduced and with less thermal insulating material a better insulation is obtained.

FIGS. 8A-8E show some temperature graphs illustrating the machine behaviour in the brewing and steam-supplying modes. As will be described here below, some of the temperature values refer to the actual water temperature, and other temperatures are actually measured on the water heater. The structure of the water heaters is such that the temperature measured in a selected point in the body 41 or 51 of the heater is strictly correlated to the actual temperature of the water.

Figure 8A:
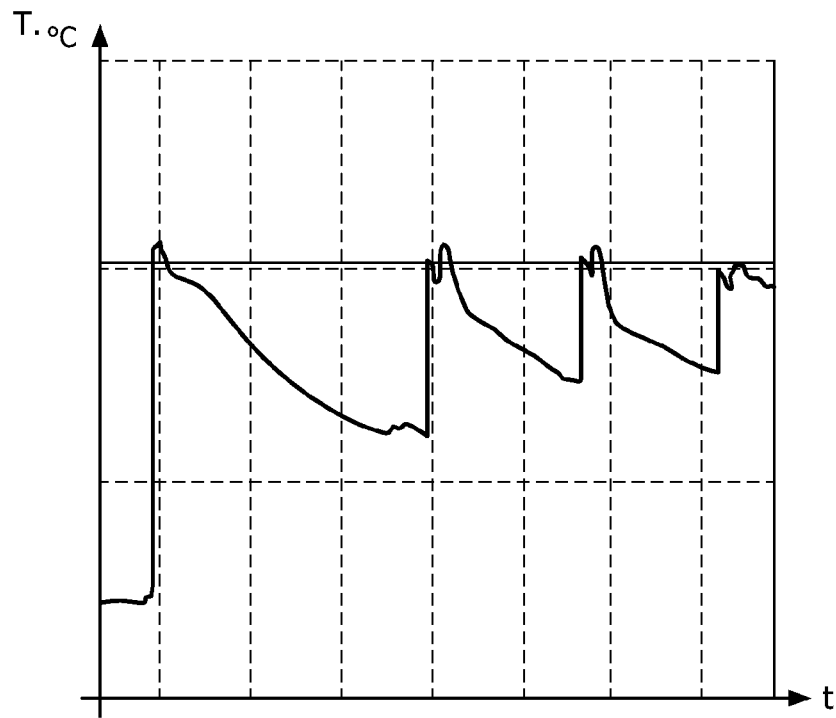

More in particular FIG. 8A shows the water temperature vs. time at the inlet of the brewing unit 15 when a device 2 formed by the two coupled water heaters 9 and 23 is used.

Figure 8B:
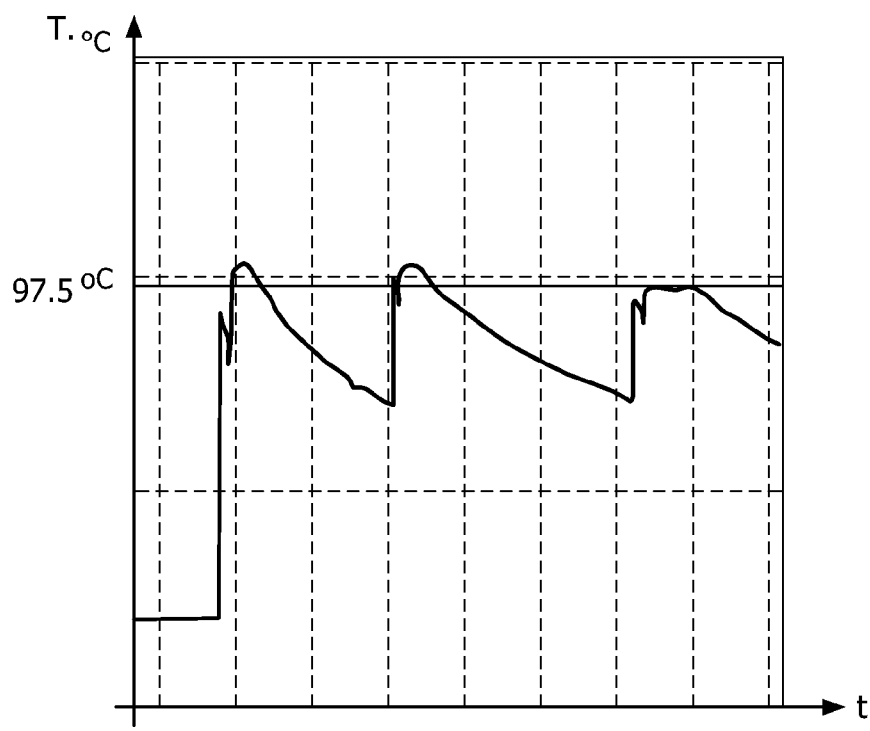

FIG. 8B shows the water temperature vs. time at the inlet of the brewing unit 15, in case a traditional water heater is used, that is in substance a water heater made up only of the body 41 not mechanically and thermally connected to the body 51 of the water heater 23. From the comparison of the two FIGS. 8A e 8B it can be noted that the temperature behaviour in the brewing unit 15 in case of the device 2 according to the invention is compatible with the conditions of a correct coffee brewing.

Figure 8C:
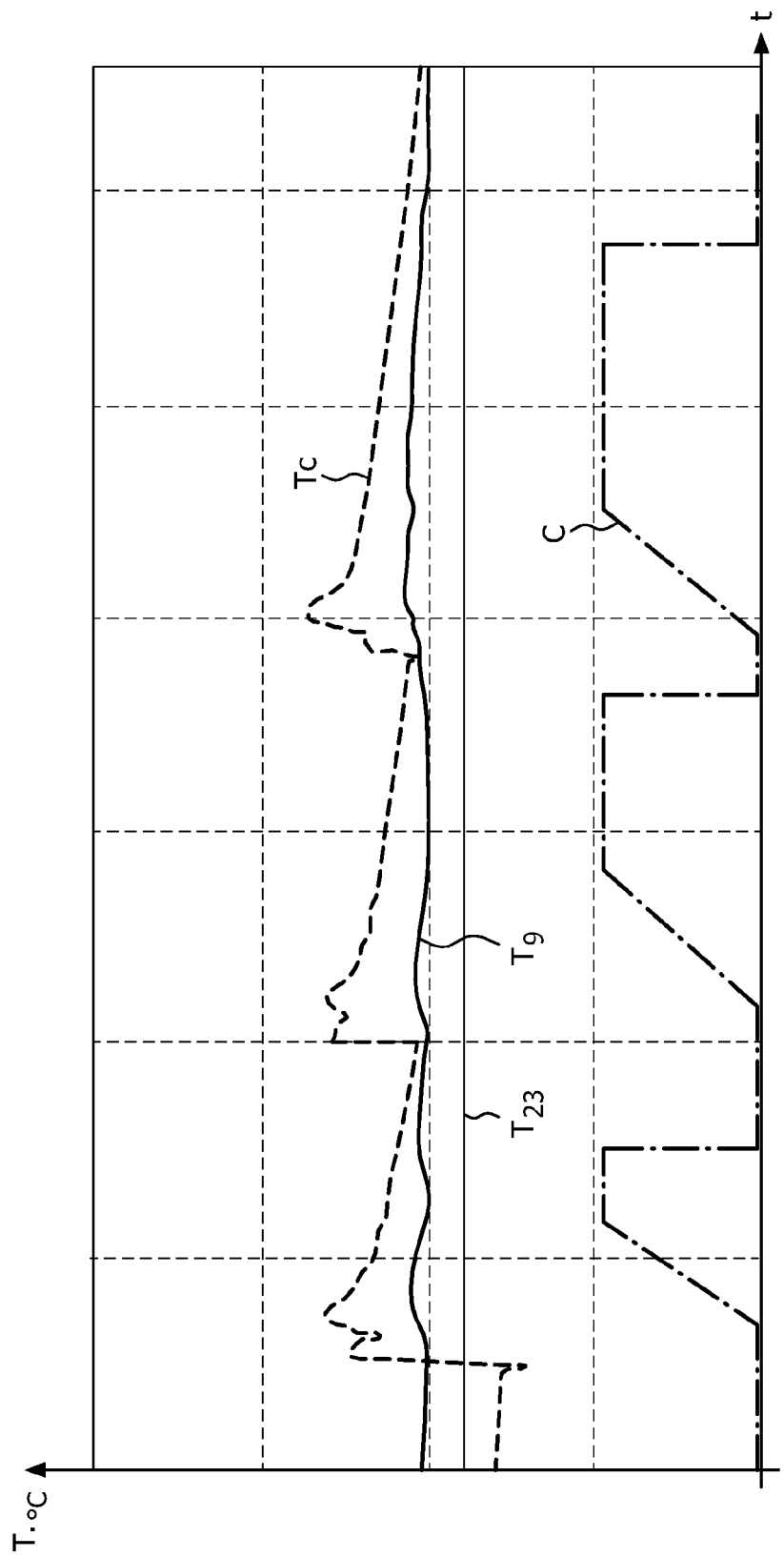

FIG. 8C shows the temperatures of the water heater 9 and of the water heater 23 vs. time during a series of coffee brewing cycles. The temperature in the water heater 9 is shown at $T_9$ and the temperature in the water heater 23 is shown at $T_{23}$. These temperatures are measured by temperature sensors 47 and 57 in suitable positions in the metal block forming the respective body 41 and 51 of the water heater. These temperature values are strictly correlated to the water temperature values, as noted above. In FIG. 8C it can be noted that the water heater 23 remains substantially at a constant and slightly lower temperature with respect to the temperature value around which the temperature $T_9$ of the water heater 9 oscillates. The temperature curve in the coffee brewing chamber, i.e. the temperature of the water at the inlet of the brewing chamber, is designated with Tc and the weight of the drink gathered in a small cup arranged at the outlet of the coffee supply unit is designated with C. The curve C grows linearly until it reaches a constant value, corresponding to the final quantity of supplied coffee in one cycle.

Figure 8D:
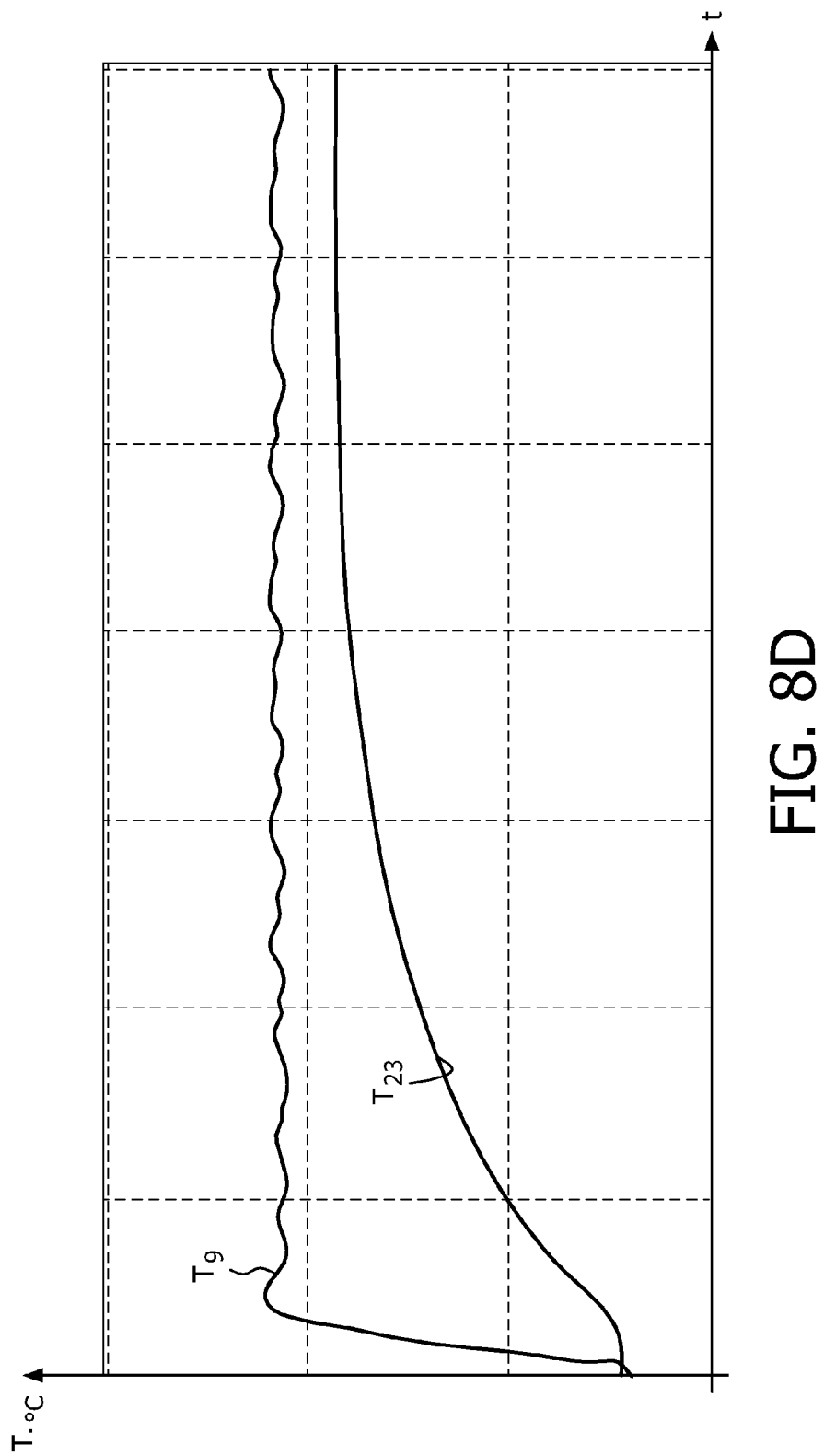

FIG. 8D shows the temperatures $T_9$ and $T_{23}$ detected by the temperature sensors 47 and 57 in the water heaters 9 and 23 in the transitory phase subsequent the machine switching-on. As said previously, when the machine is not requested to produce steam, the resistance 53 remains switched off, whereas only the resistance 43 is powered. Notwithstanding this, as shown by FIG. 8D, whereas the temperature $T_9$ reaches quickly a substantially constant value (around 90-100° C., for example), the temperature $T_{23}$ of the water heater 23 increases too, although slower, until reaching a substantially constant value, slightly lower than the temperature $T_9$ of the water heater 9. The heating according to the temperature curve $T_{23}$ is obtained in passive way by the effect of the thermal conduction between the bodies 41 and 51 of thermally conductive material of the two water heaters 9 and 23.

FIG. 8E shows the temperature vs. time of the two water heaters 9 and 23 during a steam supply cycle. The temperature of the water heater 9 detected by the temperature sensor 47 is still shown at $T_9$, whereas the temperature measured by the sensor 57 of the water heater 23 is designated with $T_{23}$. At the instant $t_0$ the order for activating the steam supply cycle is given to the device 2 by the central unit 35. As a consequence the electrical resistance 43 is switched off whereas the electrical resistance 53 is switched on. The temperature $T_{23}$, already near to the value of about 95° C. of the first water heater 9, is abruptly increased until reaching a value which in the diagram is designated in 126° C. and which represents the steam supply temperature. Once this temperature is reached, the pump 7 is started to feed a low water flow to the device 2. The feeding can be impulsive, and in this case an oscillation of the temperature $T_{23}$ follows, due to the fact that at each pulse of the pump 7 there is a heat absorption by the water heater for the steam production. During this phase, which ends at the instant $t_1$, the temperature of the water heater 9 detected by the temperature sensor 47 decreases slightly below the value at which the temperature $T_9$ is usually kept. The duration of the steam supply cycle is always relatively short and therefore the temperature decrease of the water heater 9 is limited and it is however opposed by the heat transfer by conduction from the water heater 23 to the water heater 9 due to the effect of the thermal contact between the bodies 41 and 51.

At the instant $t_1$ the resistance 53 is switched off and the resistance 43 is switched on again. This involves, on one side, the increase of the temperature $T_9$ of the water heater 9 and, on the other side, a gradual lowering in the temperature $T_{23}$ of the water heater 23. The temperature of the water heater 9 can reach the value of 126° C. and then quickly fall until reaching again the value around 95° C. at which this water heater has to be actually kept during waiting or during the coffee supply cycles. With a suitable electronic control of the temperature of the water heater 9, by means of the central unit 35, the temperature peak value which is reached in this water heater after switching from the steam supply cycle to the waiting situation can be reduced.

Figure 9:
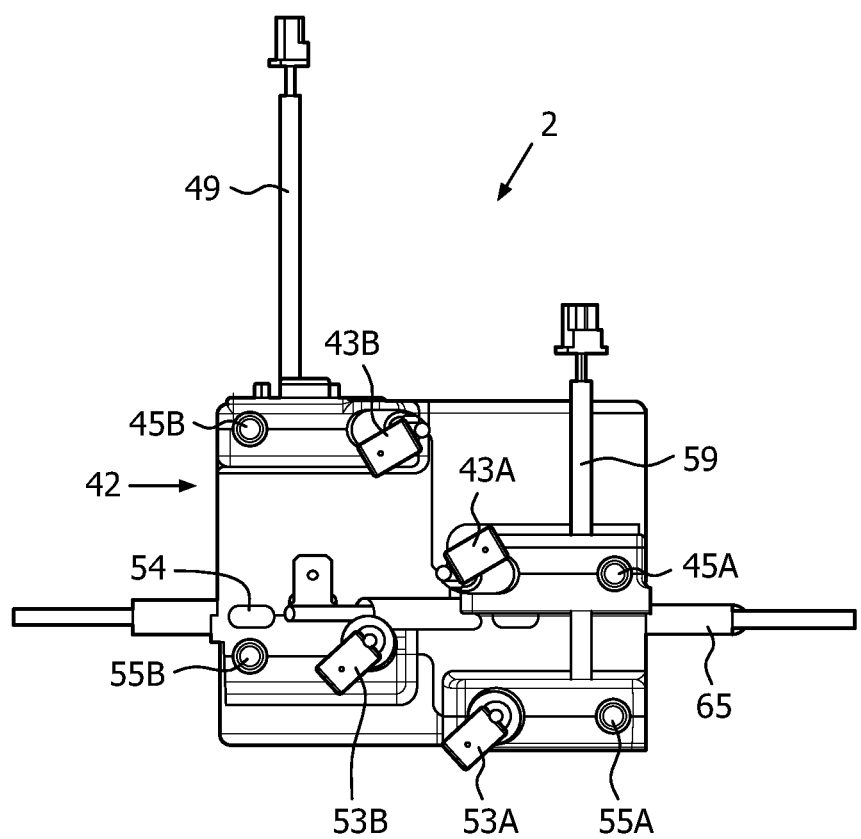
FIG. 9 shows a scheme of a device according to the invention in a second embodiment.

In the so-far described example the device 2 comprises two water heaters 9 and 23 formed with two bodies 41 and 51 physically separated and thermally and mechanically coupled to one another. In other embodiments it can be provided that the two bodies 41 and 51 are formed by a single block of thermally conductive material, manufactured for example by pressure die casting in a single mould. FIG. 9 shows an exemplary embodiment of this type. The same numbers designate portions equal or equivalent to those of FIGS. 2 to 7. The bodies 41 and 51 are replaced by a single body 42 of thermally conductive material. In order to calibrate the thermal flow between the two water heaters empty compartments 54 can be provided inside the block of thermally conductive material forming the body 42, to increase the thermal resistance between the two portions of the body 42, for example to avoid an excessive heating of the duct 45 when the water heater 51 is operating.

Figure 10:
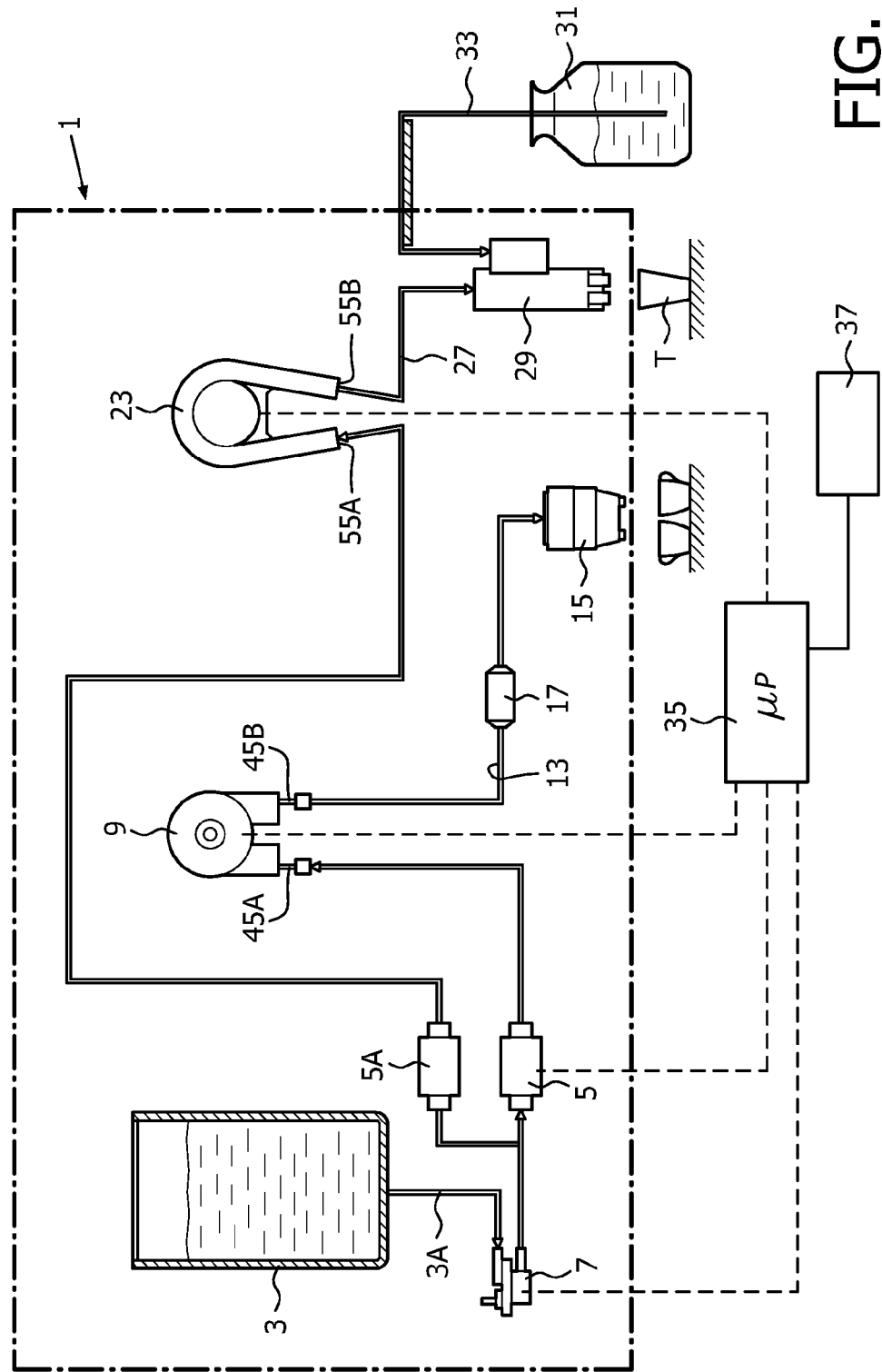
FIG. 10 shows a scheme of a device similar to the scheme of FIG. 1, but with the water heaters placed in parallel.
Figure 11:
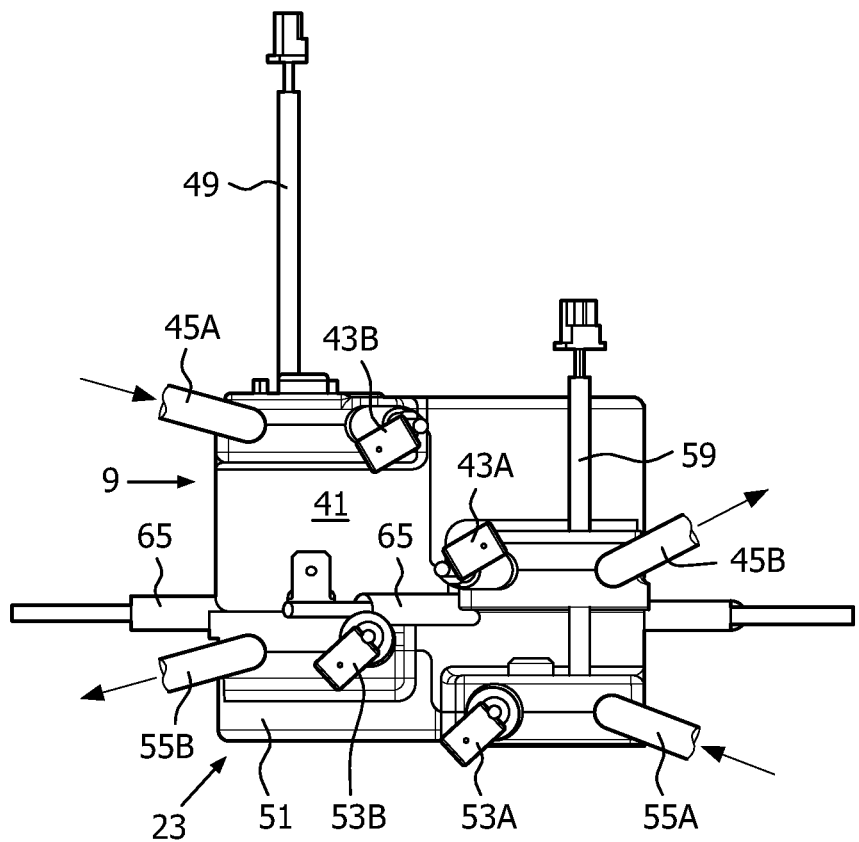
FIG. 11 shows a view similar to the view of FIG. 6, in case of water heaters placed in parallel according to the scheme of FIG. 10.

FIGS. 10 and 11 show briefly a modified embodiment, wherein the water heaters are arranged in parallel. Equal numbers designate portions equal or equivalent to those of the previous embodiments. FIG. 10 shows a general hydraulic system, similar to that of FIG. 1. In the illustrated example two pumps 5 and 5A are used to feed independently the one from the other the two water heaters, still designated with 9 and 23. The possibility of using a single pump is not excluded, for example with an electronic control to obtain the required pressure in the water heater, which usually is different for the water heater 9 and for the water heater 23. A valve downstream of the pump will then provide for supplying water to the first or to the second water heater alternatively.

FIG. 11 shows a view similar to the one of FIG. 6, but with the water heaters in parallel according to the scheme of FIG. 10.

In this additional exemplary embodiment it is understood that the device can keep the water heater 9 in temperature and ready to supply brewing water towards the brewing unit 15, for example to produce coffee. The water heater 23 can be kept with the resistance 53 switched off and at a higher temperature than the room temperature (for example at a temperature of 70-80° C.) by the effect of the thermal exchange by conduction between the two bodies of the water heaters. When brewing water is requested, the pump 5 is activated. When steam is requested, the water heater 23 is brought in temperature and the pump 5A is activated. Also in this configuration, advantages similar to those described above with reference to the arrangement in series of the two water heaters are obtained.

It is understood that the drawing shows only not limiting embodiment examples of the invention, which can vary in the forms and arrangements all within the concept scope underlying the invention. The possible presence of reference numbers in the enclosed claims aims at facilitating the reading of the claims by referring to the description and the drawing, and it does not limit the protection scope represented by the claims.

The invention claimed is:

1. A device for heating water and producing steam comprising:
    a first flow-through water heater, having a first water duct and a first heating member; and
    a second flow-through water heater, having a second water duct and a second heating member;
    wherein said first water heater and said second water heater are in thermal connection one to the other,
    wherein said first heating member and said second heating member are configured to selectively produce hot water and steam respectively, and
    wherein said first water heater and said second water heater comprise a mass of thermally conductive material through which heat is exchanged between the first water heater and the second water heater,
    the device further comprising:
    a connection between said first water duct of the first flow-through water heater and said second water duct of the second flow-through water heater; and
    a switching device for switching between said first water duct of the first flow-through water heater and said second water duct of the second flow-through water heater, said switching device being configured to alternatively:
        connect in series said first water duct and said second water duct to allow for a water flow from the first water duct to the second water duct, the water flow flowing from the first flow-through water heater to the second flow-through water heater, and
        bypass the second water duct of the second flow-through water heater to allow for a supply of hot water from the first water duct of the first flow-through water heater to a supply line,
    wherein the first and second flow-through heaters are resistive heaters.

2. The device according to claim 1, wherein said first heating member and said second heating member comprise respectively at least a first electrical resistance and at least a second electrical resistance.

3. The device according to claim 2, wherein said first electrical resistance and said second electrical resistance are configured to be switched on alternatively, depending upon at least one of a temperature and a phase state at which the water is to be delivered.

4. The device according to claim 2, wherein said first electrical resistance and said second electrical resistance are configured to be switched on simultaneously during a steam supply phase, and are further configured to be switched on alternatively during a hot water supply phase.

5. The device according to claim 1, wherein said first water duct and said second water duct have a helical shape comprising at least one turn.

6. The device according to claim 1, wherein said mass of thermally conductive material comprises a first body of thermally conductive material and a second body of thermally conductive material in thermal contact with one another.

7. The device according to claim 1, wherein said first water heater further comprises a first body of thermally conductive material and said second water heater further comprises a second body of thermally conductive material, the first body of thermally conductive material having a first face for thermally coupling to said second body of thermally conductive material, said second body of thermally conductive material having a second face for thermally coupling to said first body of thermally conductive material, said first body and said second body being mechanically coupled therebetween with said first face for thermally coupling and said second face for thermally coupling in contact therebetween.

8. The device according to claim 7, wherein a temperature device for protecting from over-temperature is arranged between said first face and said second face.

9. The device according to claim 1, wherein said mass of conductive material comprises a body of thermally conductive material having a single-block structure, said single-block structure enclosing said first water heater and said second water heater, and said body of thermally conductive material transmitting heat by conduction between said first water heater and said second water heater.

10. The device according to claim 1, wherein the first water duct has a larger inner volume than the second water duct.

11. The device according to claim 1, further comprising a first temperature sensor associated to the first water heater and a second temperature sensor associated to the second water heater, said first and second temperature sensors being connected to a control unit.

12. The device according to claim 11, wherein said control unit is configured to adjust a temperature of the first water heater and of the second water heater, and is further configured to control said switching device based on a supply request by a user.

13. The device according to claim 11, wherein said control unit is configured to keep said first water heater at a first temperature by controlling said first heating member, the water at said first temperature being supplied through said supply line without flowing through the second water duct, and is further configured to raise the water temperature of said second water heater to a second temperature higher than said first temperature by controlling said second heating member, the water at said second temperature being allowed to flow through said first water duct and said second water duct by said switching member controlled by said control unit.

14. The device according to claim 11, wherein said control unit is configured to keep said first water heater at a first temperature by controlling said first heating member and by keeping the second heating member switched off, the water at said first temperature being supplied through said supply line without flowing through the second water duct, and wherein said control unit is further configured to raise the water temperature to a second temperature higher than said first temperature by controlling said second heating member, by controlling said switching device so as to make the water to flow through said first water duct and said second water duct, and by keeping said first heating member switched off.

15. The device according to claim 13, wherein at said second temperature the water in the water flow is supplied under a phase state of steam.

16. The device according to claim 1, further comprising a thermally insulated housing wherein said first and said second water heater are enclosed.

17. A machine for producing hot drinks, the machine having a device for heating water and producing steam, the machine comprising:
   a first flow-through water heater having a first water duct and a first heating member; and
   a second flow-through water heater having a second water duct and a second heating member;
   wherein said first water heater and said second water heater are in thermal connection with each other,
   wherein said first heating member and said second heating member are configured to selectively produce hot water and steam respectively, and
   wherein said first water heater and said second water heater comprise a mass of thermally conductive material through which heat is exchanged between the first water heater and the second water heater,
   the device further comprising:
   a connection between said first water duct of the first flow-through water heater and said second water duct of the second flow-through water heater; and
   a switching device for switching between said first water duct of the first flow-through water heater and said second water duct of the second flow-through water heater, said switching device being configured to alternatively:
      connect in series said first water duct and said second water duct to allow for a water flow from the first water duct to the second water duct, the water flow flowing from the first flow-through water heater to the second flow-through water heater, and
      bypass the second water duct of the second flow-through water heater to allow for a supply of hot water from the first water duct of the first flow-through water heater to a supply line,
   wherein the first and second flow-through heaters are resistive heaters.

18. The device according to claim 1, wherein the switching device is a three-way electrovalve.

* * * * *